US011429298B2

United States Patent
Wei et al.

(10) Patent No.: US 11,429,298 B2
(45) Date of Patent: Aug. 30, 2022

(54) SYSTEM AND METHOD FOR TYING NON-VOLATILE DUAL INLINE MEMORY MODULES TO A PARTICULAR INFORMATION HANDLING SYSTEM

(71) Applicant: DELL PRODUCTS, LP, Round Rock, TX (US)

(72) Inventors: Hung-Tah Wei, Round Rock, TX (US); Sundar Dasar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 212 days.

(21) Appl. No.: 16/415,468

(22) Filed: May 17, 2019

(65) Prior Publication Data
US 2020/0363974 A1 Nov. 19, 2020

(51) Int. Cl.
*G06F 3/06* (2006.01)

(52) U.S. Cl.
CPC .......... *G06F 3/0644* (2013.01); *G06F 3/0604* (2013.01); *G06F 3/0659* (2013.01); *G06F 3/0679* (2013.01)

(58) Field of Classification Search
CPC .... G06F 3/0644; G06F 3/0679; G06F 3/0659; G06F 3/0604
See application file for complete search history.

(56) References Cited

U.S. PATENT DOCUMENTS

| | | | |
|---|---|---|---|
| 9,348,604 B2 | 5/2016 | Munger et al. | |
| 9,524,390 B2 | 12/2016 | Kulkarni et al. | |
| 2009/0006859 A1* | 1/2009 | Zimmer | G06F 21/575 713/186 |
| 2010/0332813 A1* | 12/2010 | Rothman | G06F 9/4401 713/2 |
| 2014/0281474 A1 | 9/2014 | Shutt et al. | |
| 2017/0329612 A1 | 11/2017 | Ragupathi et al. | |
| 2019/0243659 A1* | 8/2019 | Lewis | G06F 9/4401 |

OTHER PUBLICATIONS

Ali et al., PMEM Performance in vSphere 6.7 with Intel Optane DC Persistent Memory, Apr. 2, 2019, VMware, p. 3 (Year: 2019).*

* cited by examiner

*Primary Examiner* — David Yi
*Assistant Examiner* — Alan Otto
(74) *Attorney, Agent, or Firm* — Larson Newman, LLP (57) ABSTRACT

A non-volatile dual in-line memory module (NVDIMM) instantiates first and second partitions of non-volatile memory. The first partition is reserved and is not accessible to an operating system, and the second partition is accessible to the operating system. A processor may generate information uniquely associated with an information handling system and write the information to the first partition.

20 Claims, 6 Drawing Sheets

SYSTEM AND METHOD FOR TYING NON-VOLATILE DUAL INLINE MEMORY MODULES TO A PARTICULAR INFORMATION HANDLING SYSTEM

FIELD OF THE DISCLOSURE

The present disclosure generally relates to information handling systems, and more particularly relates to tying Non-Volatile Dual Inline Memory Modules (NVDIMMs) to a particular information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may include a non-volatile dual in-line memory module (NVDIMM) and a processor. The NVDIMM may instantiate first and second partitions of non-volatile memory. The first partition may be reserved and is not accessible to an operating system instantiated on the information handling system. The second partition may be accessible to the operating system. The processor generates information uniquely associated with the information handling system and writes the information to the first partition.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
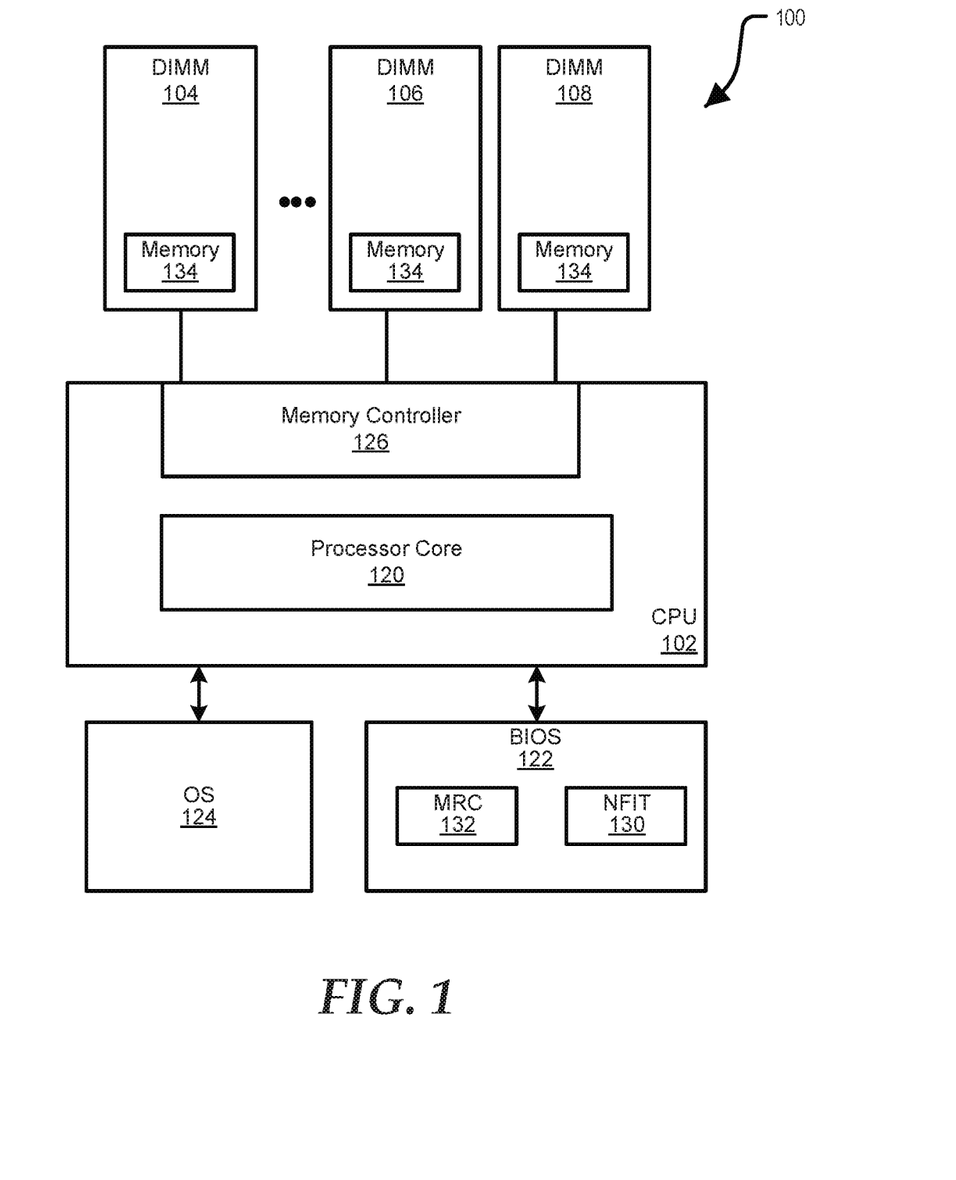
FIG. 1 is a block diagram of a portion of an information handling system according to at least one embodiment of the disclosure.

FIG. 1 shows a portion of an information handling system 100 including a CPU or processor 102, and dual in-line memory modules (DIMMs) 104, 106, and 108. CPU 102 includes a processor core 120 and a memory controller 126. CPU 102 may include additional components (not shown), without varying from the scope of this disclosure. CPU 102 executes code to implement a basic input/output system (BIOS) 122, and upon completion of a boot process of the BIOS, executes an operating system (OS) 124. BIOS 122 represents firmware code utilized during the boot process to execute a power-on self-test (POST), to initialize the hardware components of information handling system 100, and to pass execution to OS 124. For example, the hardware components of information handling system 100 initialized by BIOS 122 may include, but are not limited to, CPU 102 and DIMMs 104, 106, and 108. BIOS 122 also represents firmware code to provide runtime services for OS 124 and other programs executed by CPU 102. BIOS 122 includes a non-volatile dual in-line memory module (NVDIMM) firmware interface table (NFIT) 130, and memory reference code (MRC) 132. NFIT 130 stores information including, but not limited to, persistent memory ranges and properties for DIMMs 104, 106, and 108.

DIMMS 104, 106, and 108 represent DIMMs that make one or more types of memory 134 accessible to CPU 102 for data storage. For example, DIMMs 104, 106, and 108 may include dynamic random access memory (DRAM), flash memory storage, NVDIMM storage, or other types of storage, as needed or desired. When one or more of DIMMs 104, 106, or 108 represents NVDIMM storage, the NVDIMM storage may include: NVDIMM-F having only persistent memory, such as flash storage; NVDIMM-N having both flash storage and DRAM on the same memory module; NVDIMM-P having persistent DRAM; and NVDIMM-X having NAND flash storage and DRAM on the same memory module. In a particular embodiment, one or more of DIMMs 104, 106, and 108 represent NVDIMMs that utilize Intel Optane DC Persistent Memory Modules (Apache Pass (AEP)) DIMMs with memory 134 configured according to one of the memory types stated above, such as NVDIMM-F. One of ordinary skill in the art will recognize that while FIG. 1 illustrates DIMMs 104, 106, and 108, this disclosure is not limited to three DIMMs but can be applied to any number of DIMMs, as indicated by the ellipses in between DIMMs 104 and 106. In an embodiment, one or more of DIMMs 104, 106, and 108 may include additional components (not shown), without varying from the scope of this disclosure.

CPU 102 provides the data processing functionality of information handling system 100, such as is typically associated with an information handling system. As such, CPU 102 represents a data processing apparatus, such as one or more processor cores, and the associated data input and output (I/O) functionality, such as a chipset component, and other I/O processor components. CPU 102 operates to execute machine-executable code to perform the data processing tasks associated with information handling system 100.

BIOS 122 can be referred to as a firmware image, and the term BIOS is herein used interchangeably with the term firmware image, or simply firmware. BIOS 122 includes instructions executable by CPU 102 to initialize and test the hardware components of system 100, and to load a boot loader or OS 124 from a mass storage device. BIOS 122 additionally provides an abstraction layer for the hardware, i.e. a consistent way for application programs and operating systems to interact with the keyboard, display, and other input/output devices. When power is first applied to information handling system 100, the information handling system begins a sequence of initialization procedures. During the initialization sequence, also referred to as a boot sequence, components of information handling system 100 are configured and enabled for operation, and device drivers for the components is installed. Device drivers provide an interface through which other components of information handling system 100 communicate with a corresponding device.

In a particular embodiment, BIOS 122 is substantially compliant with one or more revisions of the Unified Extensible Firmware Interface (UEFI) specification. The UEFI specification standard replaces the antiquated personal computer BIOS system found in some older information handling systems. The UEFI specification provides standard interfaces and interoperability guidelines for devices and components that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of information handling system 100. While the techniques disclosed herein are described in the context of a UEFI compliant system, one of skill will appreciate that the disclosed systems and methods can be implemented at substantially any information handling system having configurable firmware.

Memory controller 126 represents a portion of a processor complex that is dedicated to the management of the data storage and retrieval from the memory devices of information handling system 100, and the information handling system 100 may include one or more additional memory controllers similar to the memory controller 126, as needed or desired. Memory controller 126 may reside on a system printed circuit board, may be integrated into an I/O processor component, may be integrated with a processor on a system-on-a-chip (SoC), or may be implemented in another way, as needed or desired. Memory controller 126 operates to provide data and control interfaces to one or more DIMMs, such as DIMMs 104, 106, and 108, in accordance with a particular memory architecture. For example, memory controller 126 and the DIMMs 104, 106, and 108 may operate in accordance with a Double-Data Rate (DDR) standard, such as a JEDEC DDR4 or DDR5 standard.

Typically, before any usable memory 134 within DIMMs 104, 106, and 108 may be accessed by OS 124, BIOS 122 performs a POST for information handling system 100. During the POST, BIOS 122 executes MRC 132 to access information associated with DIMMs 104, 106, and 108 and configure a memory address decode register for DIMMs 104, 106, and 108 as will be described herein. In an embodiment, the information associated with DIMMs 104, 106, and 108 stored within the memory address decode register may include, but is not limited to, a mode of operation for DIMMs 104, 106, and 108, and a total amount of memory for the DIMMs, and the like. The mode of operation can be an application-direct mode, a memory mode, a storage mode, or the like. In the application-direct mode, applications executed by processor core 120 via OS 124 directly access data stored within DIMMs 104, 106, and 108. In the memory mode, a DRAM portion of DIMMs 104, 106, and 108 are accessed by processor core 120 of CPU 102 to store data in the DIMMs. In the storage mode, data is accessed in DIMMs 104, 106, and 108 in a block data format. These modes of operation can be set as attributes for DIMMs 104, 106, and 108 by the OS 124, by UEFI environment of BIOS 122, or the like. After the memory address decode register has been configured for DIMMs 104, 106, and 108 and other operations of POST have been completed, BIOS 122 may exit POST and processor core 120 performs one or more runtime operations of OS 124.

Figure 2:
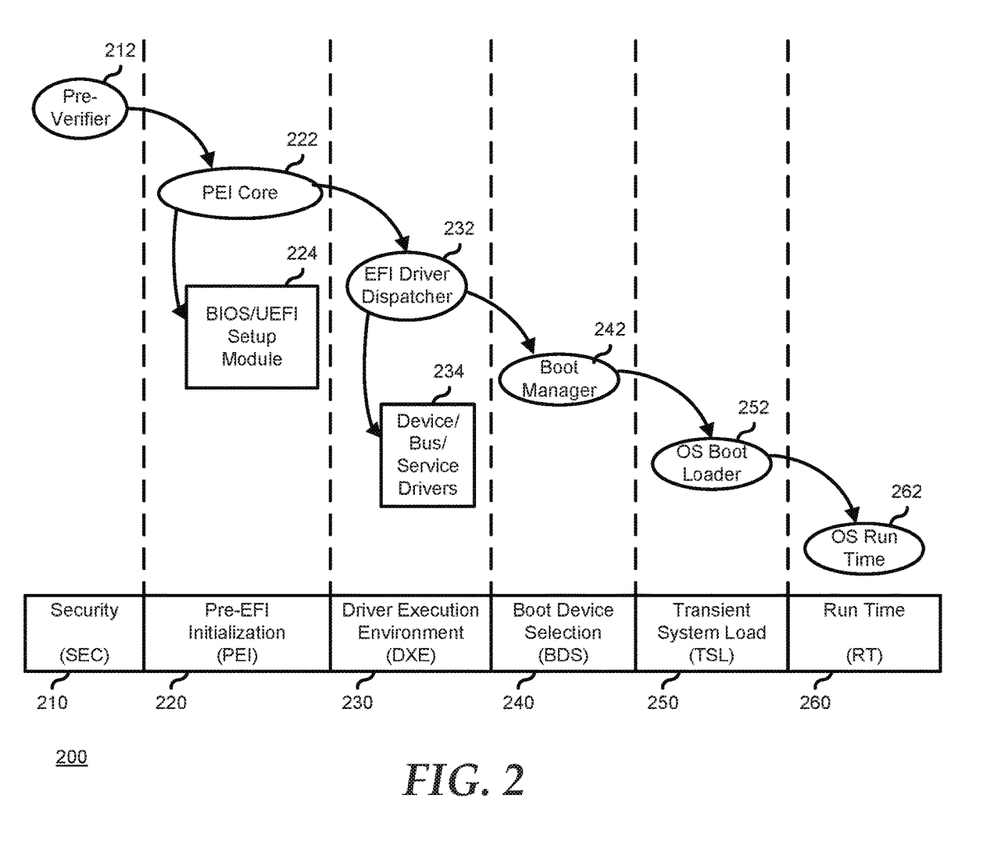
FIG. 2 is a phase diagram for a UEFI boot of the information handling system according to at least one embodiment of the disclosure.

FIG. 2 illustrates a phase diagram 200 for an information handling system that operates using a UEFI, including a security phase (SEC) 210, a pre-EFI initialization phase (PEI) 220, a driver execution environment phase (DXE) 230, a boot device selection phase (BDS) 240, a transient system load phase (TSL) 250, a run time phase (RT) 260, and an afterlife phase (AL) (not shown). SEC 210 is the first phase of a UEFI boot process on the information handling system that operates to set up a pre-verifier 212. Pre-verifier 212 handles all restart events on the information handling system, and temporarily allocates a portion of memory for use during the other boot phases. SEC 210 is executed out of the firmware resident on the information handling system, such as BIOS 122, and so serves as a root of trust for the system. SEC 210 passes execution to PEI 220 which initializes the system memory for the information handling system. PEI 220 includes CPU initialization 224, chipset initialization (not shown), and board resource initialization (not shown).

PEI 220 passes execution to DXE 230 which performs device specific initializations for the information handling system. In particular, DXE 230 executes an EFI driver dispatcher 232 that operates to load device, bus, and service drivers 234. For example, the EFI driver dispatcher 232 may load drivers including, but not limited to, an address range scrubbing (ARS) driver inside of MRC 332 of FIG. 3, a block input/output (I/O) driver for communication interface 344 of FIG. 3, and a error logging driver 336 of FIG. 3. DXE 230 passes execution to BDS 240 to execute a boot manager 242 which identifies a boot target, and passes execution to TSL 250. TSL 250 launches an OS boot loader 252 which loads the operating system, and passes execution to the operating system 262 at RT 260.

Techniques disclosed herein may typically be implemented during DXE 230, and may utilize services provided by the UEFI specification, such as boot services. UEFI applications, including OS loaders, must use boot services functions to access devices and allocate memory. Services are defined by interface functions that may be used by code running in the UEFI environment. Such code may include protocols that manage device access or extend platform capability, as well as applications running in the pre-boot environment, and OS loaders. During boot, system resources are owned by the firmware and are controlled through boot services interface functions. All boot services functionality is available until an OS loader loads enough of its own environment to take control of the system's continued operation and then terminates boot services with a call to ExitBootServices( ).

One class of boot services includes protocol handler services, such as LoadImage, StartImage, InstallProtocolInterface, RegisterProtocolNotify, LocateProtocol, and numerous others. A protocol consists of a 128-bit globally unique identifier (GUID) and a Protocol Interface structure. The structure contains the functions and instance data that are used to access a device. The functions that make up Protocol Handler Services allow applications to install a protocol on a handle, identify the handles that support a given protocol, determine whether a handle supports a given protocol, and the like. LoadImage loads an image, such as a device driver, into system memory. StartImage transfers control to a loaded image's entry point. InstallProtocolInterface installs a protocol interface on a device handle. A driver can install multiple protocols. RegisterProtocolNotify registers an event that is to be signaled whenever an interface is installed for a specified protocol. LocateProtocol returns an array of handles that support a specified protocol. During DXE 230, boot services and runtime services can be started and a UEFI boot manager can load UEFI drivers and UEFI applications in an order defined by the global NVRAM variables. Driver initialization includes identifying a driver image that is stored on some type of media, such as at NVRAM 330 of FIG. 3. While the techniques disclosed herein are typically implemented during DXE 230, in another embodiment, these techniques can be implemented using UEFI system management services, such as SmmInstallProtocolInterface, SmmRegisterProtocolNotify, and the like.

Figure 3:
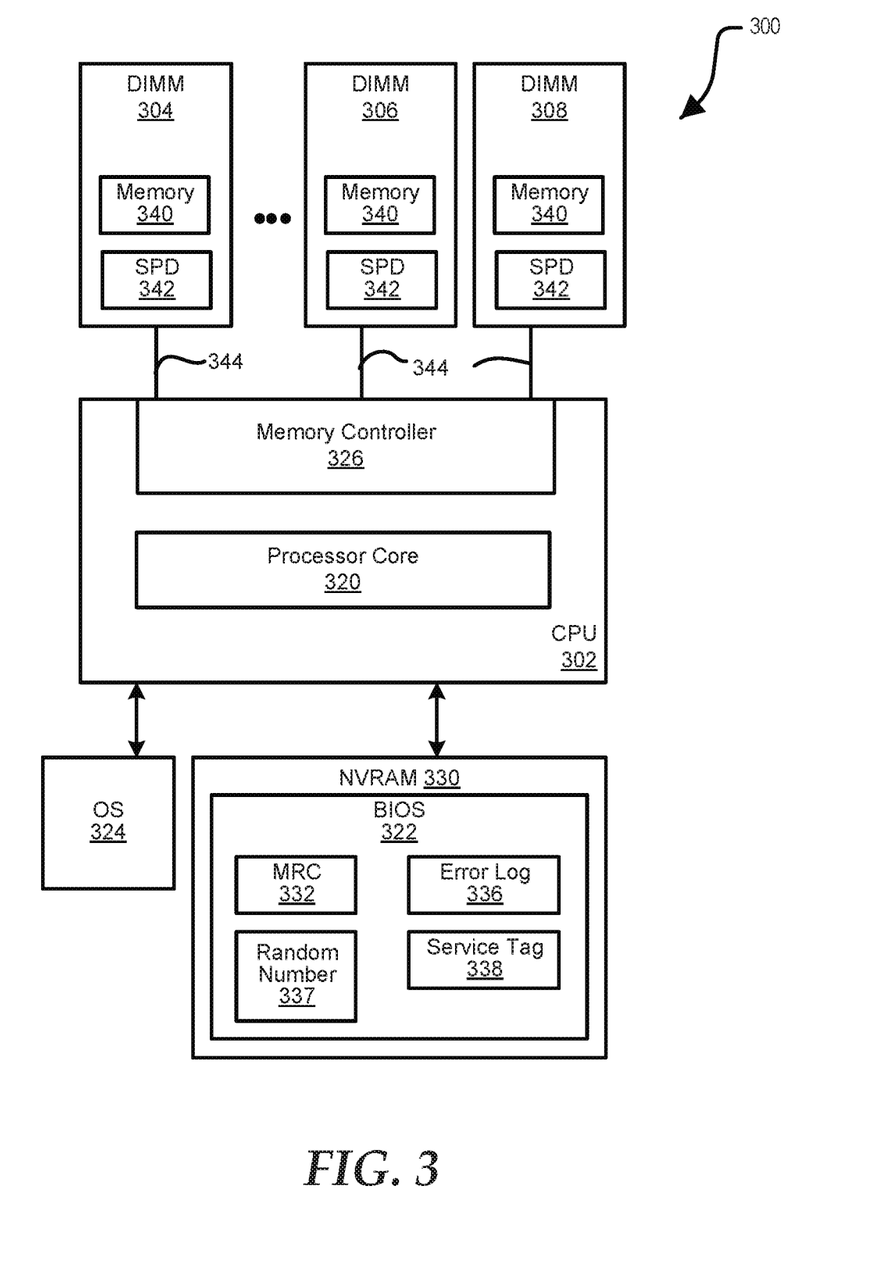
FIG. 3 is a block diagram of another portion of an information handling system according to at least one embodiment of the disclosure.

FIG. 3 illustrates an information handling system 300 similar to information handling system 100 of FIG. 1, including a CPU 302, dual in-line memory modules (DIMMs) 304, 306, and 308 (DIMMs 304-308), and a non-volatile random access memory (NVRAM) 330. Information handling system 300 may include additional components (not shown), without varying from the scope of this disclosure. CPU 302 includes a processor core 320 and a memory controller 326. CPU 302 may include additional components (not shown), without varying from the scope of this disclosure. CPU 302 is in communication with NVRAM 330, which stores a BIOS 322. CPU 302 executes BIOS 322, and upon completion of the BIOS 322 executes an OS 324.

Each of DIMMs 304, 306, and 308 includes memory 340 and serial presence detect (SPD) data 342. CPU 302 communicates with each of DIMMs 304, 306, and 308 via one or more communication interfaces 344. In an embodiment, each communication interface 344, shown between CPU 302 and DIMM 304, 306, and 308 represents one or more different communication interfaces. In particular, a first portion of communication interface 344 may represent a high-bandwidth data communication interface for communicating data between CPU 302 and memory 340. For example, the high-bandwidth data communication interface may include an interface that operates in accordance with a Double-Data Rate (DDR) standard, such as a JEDEC DDR4 or DDR5 standard. Further, a second portion of communication interface 344 may represent a low-bandwidth data communication interface for communicating data between CPU 302 and SPD data 342. For example, the low-bandwidth data communication interface may include a System Management Bus (SMBus) interface. During a boot process, such as a POST portion of DXE phase 230 of a UEFI boot process, BIOS 322 operates to access SPD data 342 from each of DIMMs 304, 306, and 308 to configure the operations between CPU 320 and the DIMMs. SPD data 342 includes information as to the configuration, capacity, signal timing requirements, and other parameters for the operation between CPU 320 and DIMMs 302, 304, and 306. After BIOS 322 configures the operations between CPU 320 and DIMMs 302, 304, and 306, the CPU can communicate with memory 340 in the DIMMs directly via the high-bandwidth communication interface.

In a particular embodiment, one or more of DIMMs 302, 304, and 306 represents a NVDIMM such as an Intel Optane DC Persistent Memory Module (DCPMM) DIMM. Here, a portion of memory 340 is reserved for various functions that are related to how the NVDIMM is to be utilized in information handling system 300. For example, BIOS 322 can store information related to the memory mode (e.g., application-direct mode, memory mode, storage mode) in which to operate the NVDIMM, to namespaces instantiated on the NVDIMM, or the like. Here, the information can be stored on different partitions of memory 340 that are restricted from access by the CPU under the control of OS 324. That is, the partitions may represent memory regions of memory 340 that are reserved to the use of BIOS 322.

Figure 4:
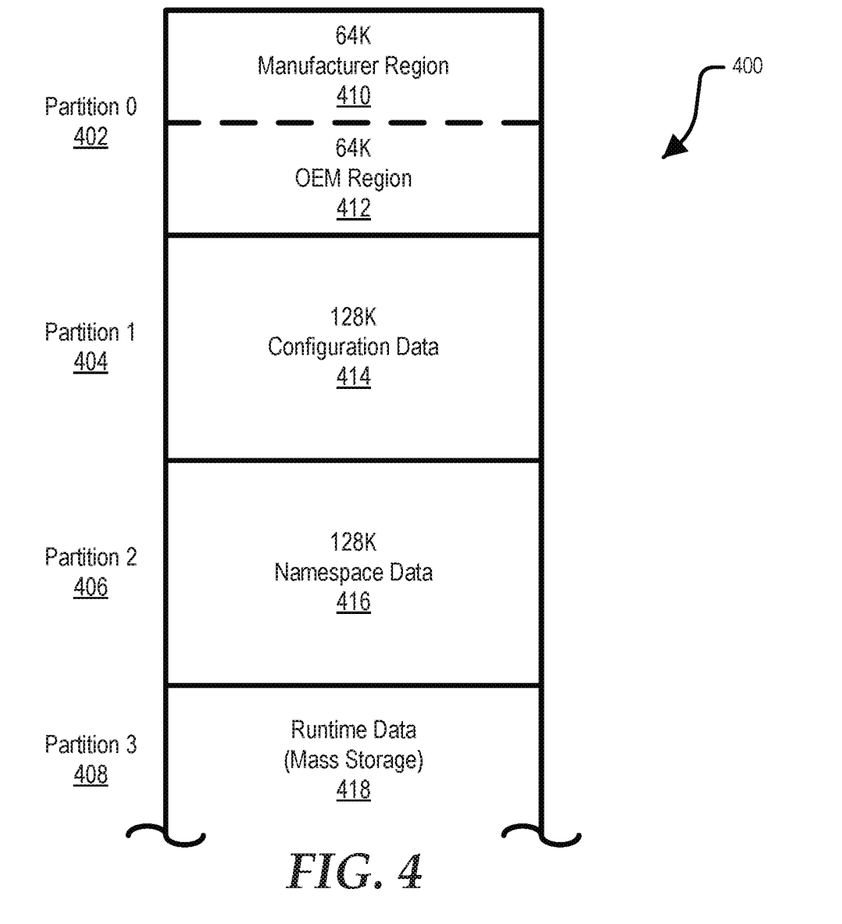
FIG. 4 is a memory map illustrating a memory partition of a NVDIMM according to at least one embodiment of the disclosure.

FIG. 4 illustrates a partition map 400 of a NVDIMM, such as an Intel Optane DC Persistent Memory Module (DCPMM) DIMM. Partition map 400 includes partitions 402, 404, 406, and 408. Partition 402 is a 128 kilobyte (KB) partition that includes a 64 KB region 410 that is reserved for information stored by a manufacturer of the NVDIMM, for example, for Intel proprietary information related to the configuration of the NVDIMM. Partition 402 also includes a 64 KB region 412 that is accessible to an original equipment manufacturer (OEM) for storage of information that is at the OEMs discretion. Various embodiments information to be stored in OEM region 412 will be described further below. Partition 404 is a 128 KB partition that includes a configuration data segment 414. Partition 406 is a 128 KB partition that includes namespace data for one or more NVDIMMs that are configured in the storage mode. Partition 408 represents the bulk of the data storage capacity of the DIMM that is usable in the selected mode by the information handling system for data storage.

Returning to FIG. 3, BIOS 322 further includes an error log module 336 that operates to detect and log errors on information handling system 300. The errors can include hardware errors, machine check exceptions, software generated errors, and the like. Generally, the error logs can be utilized to troubleshoot and determine a root cause of the fault conditions. However, when an error relates to one or more of DIMMs 304, 306, or 308, a user of information handling system 300 may access the error logs generated by error log module 336, and, after determining that the error relates to a DIMM, may return the DIMM to an OEM to determine what caused the DIMM to fail. Here, because the error logs that directed the user to identify the DIMM as failing resides on the information handling system, the OEM is deprived of critical information whereby the OEM can determine the cause of the DIMM failure.

Figure 5:
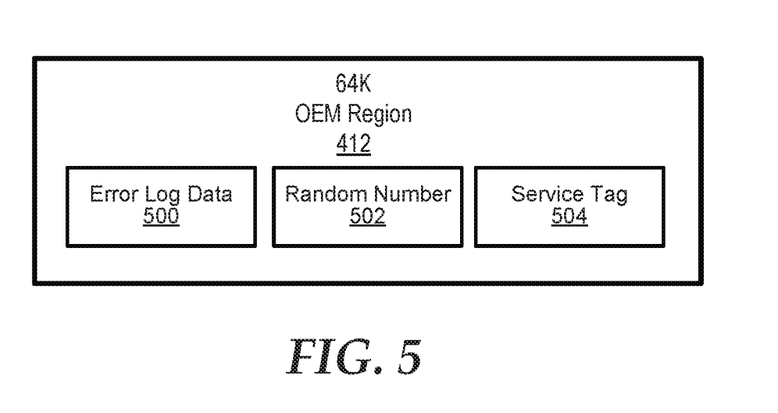
FIG. 5 illustrates an OEM region of the memory map of FIG. 4.

In a particular embodiment, a NVDIMM stores error log information in its OEM region of the NVDIMM memory to facilitate the determination of NVDIMM failures. FIG. 5 illustrates OEM region 412 in an embodiment of the present disclosure. OEM region 412 includes error log data 500. In a particular embodiment, when an error log module, such as error log module 326, detects an error in the operation of a NVDIMM, the error log module stores information related to the error in error log data 500. An example of an error in the operation of a NVDIMM that may be stored in error log data 500 may include errors in an address range scrubbing (ARS) operation during the POST of an information handling system. Other errors stored in error log data 500 may include boot time errors, such as an unclean shutdown, incomplete boot process, disabled storage media, and the like, or may include run time errors, such as changes in the health status of the NVDIMM. Additionally, error log data 500 may include a log of the number and timing of important memory related commands, such as security or overwrite related commands, or the like. For example, during a boot process, an indication as to the firmware commands issued to the NVDIMM could be utilized to determine whether or not the firmware commands were successfully executed. In a particular embodiment, when an error is detected, a System Management Interrupt (SMI) is issued to the processor of the information handling system, and the BIOS executes the error log module out of System Management BIOS (SMBIOS).

In addition to storing error log data, a typical NVDIMM may also store configuration information that may be deemed to be proprietary to an OEM, and which, if accessed by another entity than the OEM, may reveal trade secret configuration settings or the like. Likewise, the error log data itself may be desired by the OEM to be kept confidential. In such cases, because the error log data and other configuration data is typically stored in a region that can be accessed by a BIOS, someone desiring to access such confidential information typically needs only to remove the NVDIMM from the information handling system within which the errors were generated or that was set up using the confidential configuration information, install the NVDIMM to a new information handling system, and read the region that includes the desired information.

Returning to FIG. 3, BIOS 322 further includes a random number module 337, and a service tag module 338. Here, NVDIMMs 304, 306, and 308 include information within respective SPD data 342 that uniquely associated each NVDIMM with information handling system 300. For example, BIOS 322 can associate a number, such as a 64-bit number, that is randomly generated, for each one of NVDIMMs 304, 306, and 308, and can store the associated number for each NVDIMM in the particular NVDIMM's SPD data 342, and also in a location within NVRAM 322. In another example, BIOS 322 can associate a service tag number associated uniquely with information handling system 300 with each one of NVDIMMs 304, 306, and 308, and can store the information handling system service tag onto each of the NVDIMMs' SPD data 342. Other examples of uniquely associating NVDIMMs 304, 306, and 308 with information handling system 300 may include storing a CPU ID number or the like with the NVDIMMs.

In a particular embodiment, when information handling system 300 is booted, BIOS 322 operates to read the identification information (i.e., the number, the service tag, or the like) from NVDIMMs 304, 306, and 308, and to compare the identification information from the NVDIMMs with the associated information on the information handling system. If the information from NVDIMMs 304, 306, and 308 matches the information from information handling system 300, then BIOS 322 proceeds to initialize the NVDIMMs and to boot the information handling system. On the other hand, if the information from one of NVDIMMs 304, 306, and 308 does not match the information from information handling system 300, then BIOS 322 does not initialize the particular NVDIMM. Here, BIOS 322 can shut down the boot process with after providing an error message, or the BIOS can continue to boot information handling system 300 without the effected NVDIMM.

In another embodiment, when BIOS 322 boots information handling system 300, the BIOS operates to provide the association information to NVDIMMs 304, 306, and 308, and each NVDIMMs operates to check that the received association information matches the association information in its SPD data 342. If the received association information matches the association information in its SPD data 342, each NVDIMM 304, 306, and 308 operates to permit further boot operations from BIOS 322. On the other hand, if the association information received from BIOS 322 does not match the association information in its SPD data 342, each NVDIMM 304, 306, and 308 operates to block further boot operations from BIOS 322.

When one or more of NVDIMMs 304, 306, or 308 are newly installed into information handling system 300, BIOS 322 operates will receive no association information from SPD data 342. Here, BIOS 322 obtains a random number from random number generator 337, accesses the service tag information 338, or otherwise obtains association information, and writes the association information to the newly installed NVDIMM. FIG. 5 further illustrates where OEM region 412 stores random number data 502 and service tag data 504. OEM region 412 can store other association information, as needed or desired.

Figure 6:
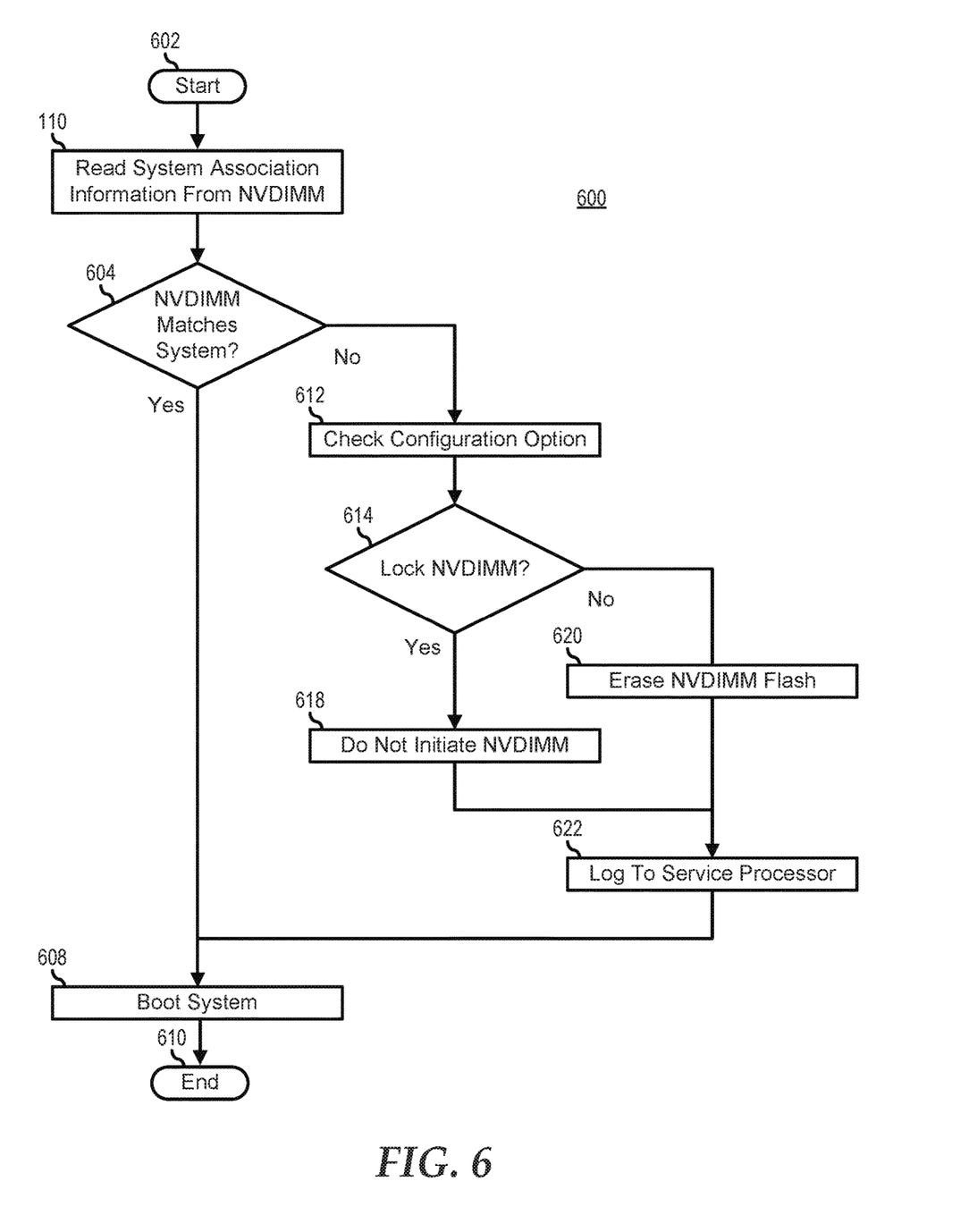
FIG. 6 is a flow diagram illustrating a method for tying NVDIMMs to a particular information handling system according to at least one embodiment of the disclosure.

FIG. 6 is a flow diagram illustrating a method 600 for tying NVDIMMs, such as an Intel Optane DCPMMs, to a particular information handling system, starting at block 602. It will be readily appreciated that not every method step set forth in this flow diagram is always necessary, and that certain steps of the methods can be combined, performed simultaneously, in a different order, or perhaps omitted, without varying from the scope of the disclosure. At block 604, a BIOS reads system association information from a NVDIMM. Here, the system association information may be a random number associated with the information handling system, a service associated with the information handling system, or another indication associated with the information handling system, as needed or desired.

A decision is made as to whether or not the system association information from the NVDIMM matches the information handling system in decision block 606. If so, the "YES" branch of decision block 606 is taken, the information handling system is booted in block 608, and the method ends in block 610. If the system association information from the NVDIMM does not match the information handling system, the "NO" branch of decision block 606 is taken and a configuration option is checked in block 612. Here, the information handling system may implement a particular configuration option that may be user selectable, as to how to handle NVDIMMs that have system association information that does not match the information handling system. For example, the information handling system may include BIOS option settings or the like that select between locking the particular NVDIMM, that is, proceeding with the boot process of the information handling system without initializing the particular NVDIMM, or not locking the NVDIMM, that is, erasing the configuration information from the particular NVDIMM.

A decision is made as to whether or not the system configuration calls for locking NVDIMMs with system association information that does not match the information handling system in decision block 614. If the system configuration calls for locking the NVDIMMs, the "YES" branch of decision block 614 is taken, the NVDIMM is isolated from the information handling system and not initialized in block 618, the method proceeds to block 622 where a service processor log is made of the fact that the system association information from the NVDIMM does not match the information handling system and that the NVDIMM was locked in block 622, and the method ends in block 610. If the system configuration does non call for locking the NVDIMMs, the "NO" branch of decision block 614 is taken, the configuration information is erased from the particular NVDIMM in block 620, the method proceeds to block 622 where a service processor log is made of the fact that the system association information from the NVDIMM does not match the information handling system and that the system configuration information was erased from the NVDIMM block 622, and the method ends in block 610.

In a particular embodiment, NVDIMMs, such as DCPMMs, can be configured to operate in one of several operating modes. For example, a NVDIMM may be configured to operate in a memory mode or in an app direct mode. When configured for memory mode, the applications and operating system instantiated on the information handling system perceives the NVDIMMs as a pool of volatile memory, similar to DRAM-only systems. When configured for app direct mode, the applications and operating system instantiated on the information handling system may be aware of two types of direct load/store memory in the information handling system, and the applications and operating system can direct which type of data read or write is suitable for DRAM DIMMS or NVDIMMs. Here, operations that require the lowest latency and don't need permanent data storage can be executed on DRAM DIMMs, while data that needs to be made persistent or structures that are very large can be routed to the NVDIMMs. Here, information stored in the configuration data portion of the NVDIMM, such as in configuration data 414 of FIG. 4, indicates whether the NVDIMM is intended to be operated in the memory mode or in the app direct mode.

In a particular case, where an NVDIMM can be configured in the memory mode or in the app direct mode, it may be a design requirement for implementing designs with such an NVDIMM that all NVDIMMs within an information handling system are configured to operate in a common operating mode. For example, when an information handling system is populated with two or more DCPMMs, it may be a design requirement that all of the DCPMMs are configured in the direct mode, or that all of the DCPMMs are configured in the app direct mode, and that none of the DCPMMs are configured to operate in an inconsistent mode. In this case, a MRC or system BIOS may operate to halt a boot process when the information handling system is populated with NVDIMMs that are configured to operate with differing operating modes, and to present an error message, such as a BIOS beep code, a port 80 code, or the like. Here, when an information handling system includes NVDIMMs that are configured to operate with a common operating mode, a problem may arise when a newly installed NVDIMM is configured to operate with a different operating mode. Here, the MRC or system BIOS may not be able to discern which of the two different operating modes to utilize in booting the information handling system.

In a particular embodiment, when an information handling system includes NVDIMMs that are configured to operate with a common operating mode, the BIOS operates to generate a random number, such as a 64-bit number, and to store the random number to the NVRAM of the information handling system, and to the OEM region of the NVDIMMs. In this way, a MRC or system BIOS can determine whether or not any NVDIMMs have been newly installed into the information handling system during a boot process. Here, when no NVDIMMs have been newly installed, all of the NVDIMMs will include the random number associated with the information handling system. On the other hand, when one or more NVDIMMs have been newly installed into the information handling system, the MRC or system BIOS can determine which one of the NVDIMMs is newly installed because that particular NVDIMM will not include the random number associated with the information handling system in its OEM region. Further, if the newly installed NVDIMM is configured to operate in a different operating mode, the MRC or system BIOS operates to reprogram the NVDIMM with the same mode configuration as the rest of the NVDIMMs on the information handling system, and stores the random number to the OEM region of the newly installed NVDIMM.

Figure 7:
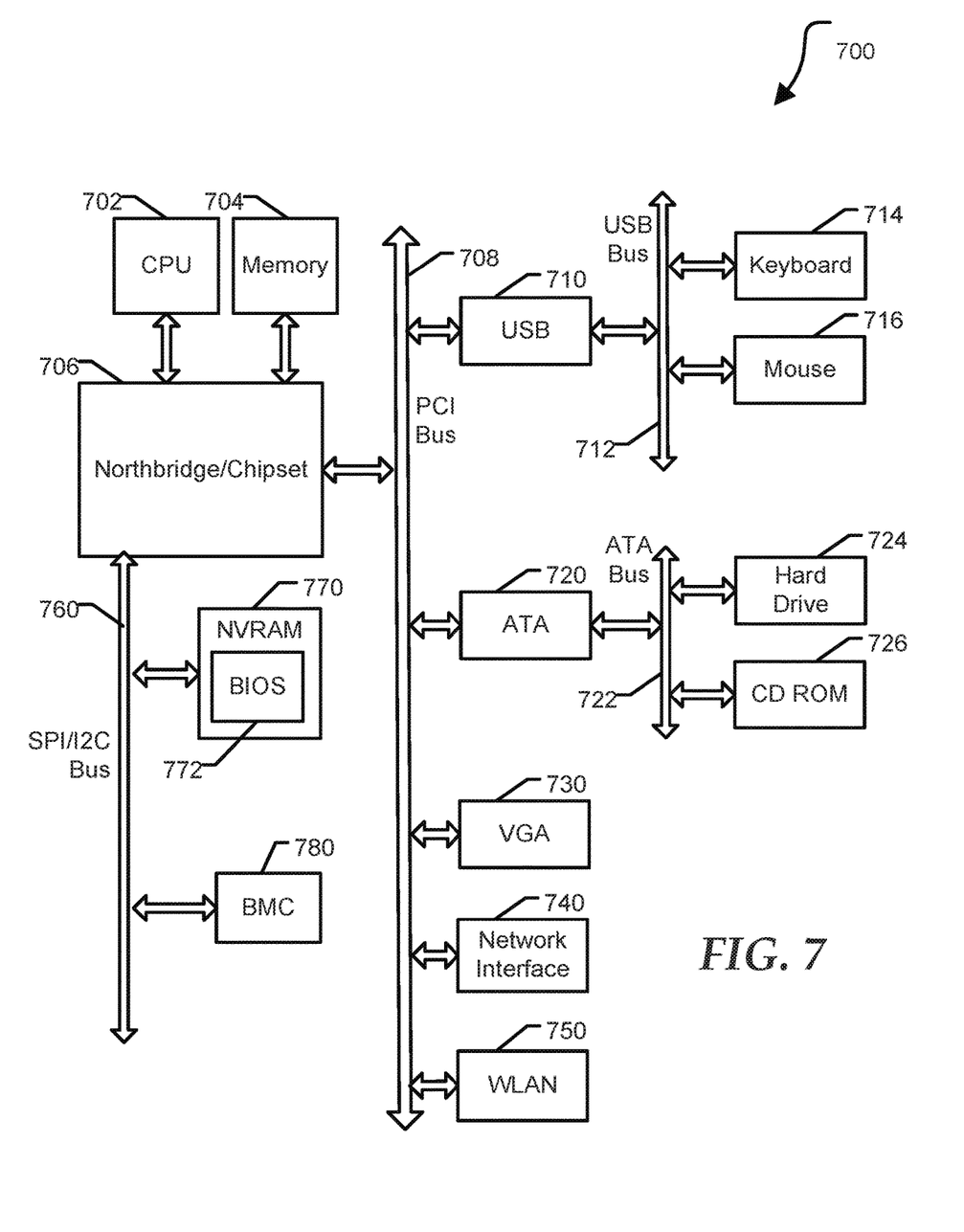
FIG. 7 is a block diagram of a general information handling system according to at least one embodiment of the disclosure.

FIG. 7 illustrates a general information handling system 700 including a processor 702, a memory 704, a northbridge/chipset 706, a PCI bus 708, a universal serial bus (USB) controller 710, a USB 712, a keyboard device controller 714, a mouse device controller 716, a configuration an ATA bus controller 720, an ATA bus 722, a hard drive device controller 724, a compact disk read only memory (CD ROM) device controller 726, a video graphics array (VGA) device controller 730, a network interface controller (NIC) 740, a wireless local area network (WLAN) controller 750, a serial peripheral interface (SPI) bus 760, a NVRAM 770 for storing BIOS 772, and a baseboard management controller (BMC) 780. In an embodiment, information handling system 700 may be information handling system 100 of FIG. 1 and/or information handling system 300 of FIG. 3. BMC 780 can be referred to as a service processor or embedded controller (EC). Capabilities and functions provided by BMC 780 can vary considerably based on the type of information handling system.

For example, the term baseboard management system is often used to describe an embedded processor included at a server, while an embedded controller is more likely to be found in a consumer-level device. As disclosed herein, BMC 780 represents a processing device different from CPU 702, which provides various management functions for information handling system 700. For example, an embedded controller may be responsible for power management, cooling management, and the like. An embedded controller included at a data storage system can be referred to as a storage enclosure processor.

For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 700 can include processing resources for executing machine-executable code, such as CPU 702, a programmable logic array (PLA), an embedded device such as a System-on-a-Chip (SoC), or other control logic hardware. Information handling system 700 can also include one or more computer-readable medium for storing machine-executable code, such as software or data.

System 700 can include additional processors that are configured to provide localized or specific control functions, such as a battery management controller. Bus 760 can include one or more busses, including a SPI bus, an I2C bus, a system management bus (SMBUS), a power management bus (PMBUS), and the like. BMC 780 can be configured to provide out-of-band access to devices at information handling system 700. As used herein, out-of-band access herein refers to operations performed prior to execution of BIOS 772 by processor 702 to initialize operation of system 700.

BIOS 772 can be referred to as a firmware image, and the term BIOS is herein used interchangeably with the term firmware image, or simply firmware. BIOS 772 includes instructions executable by CPU 702 to initialize and test the hardware components of system 700, and to load a boot loader or an operating system (OS) from a mass storage device. BIOS 772 additionally provides an abstraction layer for the hardware, such as a consistent way for application programs and operating systems to interact with the keyboard, display, and other input/output devices. When power is first applied to information handling system 700, the system begins a sequence of initialization procedures. During the initialization sequence, also referred to as a boot sequence, components of system 700 are configured and enabled for operation, and device drivers can be installed. Device drivers provide an interface through which other components of the system 700 can communicate with a corresponding device.

Information handling system 700 can include additional components and additional busses, not shown for clarity. For example, system 700 can include multiple processor cores, audio devices, and the like. While a particular arrangement of bus technologies and interconnections is illustrated for the purpose of example, one of skill will appreciate that the techniques disclosed herein are applicable to other system architectures. System 700 can include multiple CPUs and redundant bus controllers. One or more components can be integrated together. For example, portions of northbridge/chipset 706 can be integrated within CPU 702. Additional components of information handling system 700 can include one or more storage devices that can store machine-executable code, one or more communications ports for communicating with external devices, and various input and output (I/O) devices, such as a keyboard, a mouse, and a video display. For example, device controller 730 may provide data to a display device 790 to visually present the information to an individual associated with information handling system 700. An example of information handling system 700 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 700 can include a set of instructions that can be executed to cause the information handling system to perform any one or more of the methods or computer based functions disclosed herein. The information handling system 700 may operate as a standalone device or may be connected to other computer systems or peripheral devices, such as by a network.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or sub-systems that individually or jointly execute a set, or multiple sets, of instructions to perform one or more computer functions.

The information handling system 700 can include a disk drive unit and may include a computer-readable medium, not shown in FIG. 7, in which one or more sets of instructions, such as software, can be embedded. Further, the instructions may embody one or more of the methods or logic as described herein. In a particular embodiment, the instructions may reside completely, or at least partially, within system memory 704 or another memory included at system 700, and/or within the processor 702 during execution by the information handling system 700. The system memory 704 and the processor 702 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium.

Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
 a first non-volatile dual in-line memory module (NVDIMM) configured to instantiate a first partition of non-volatile memory and a second partition of non-volatile memory, the first partition being a first reserved partition that is accessible only to a basic input/output system instantiated on the information handling system, and the second partition being accessible to an operating system instantiated on the information handling system; and
 a processor configured to:
  instantiate the basic input/output system and the operating system;
  generate first information uniquely identifying the particular information handling system;
  write the first information to the first partition;
  boot the information handling system;
  read second information from a third partition of an unidentified NVDIMM, wherein the third partition is a second reserved partition that is accessible only to the basic input/output system;
  determine that the second information uniquely identifies the particular information handling system;
  determine that the unidentified NVDIMM is the first NVDIMM in response to the second information matching the first information; and
  initialize the first NVDIMM in response to determining that the unidentified NVDIMM is the first NVDIMM.

2. The information handling system of claim 1, wherein the processor is further configured to:
 determine that the second information uniquely identifies a different information handling system;
 determine that the unidentified NVDIMM is not the first NVDIMM in response to determining that the second information uniquely identifies the different information handling system; and
 determine if a configuration option is in a first state or in a second state in response to determining that the unidentified NVDIMM is not the first NVDIMM.

3. The information handling system of claim 2, wherein the processor is further configured to:
 halt initialization of the unidentified NVDIMM when the configuration option is in the first state.

4. The information handling system of claim 3, wherein the processor is further configured to:
 erase a fourth partition of non-volatile memory of the unidentified NVDIMM when the configuration option is in the second state, the fourth partition being accessible to the operating system.

5. The information handling system of claim 3, wherein the processor is further configured to:
 erase the third partition when the configuration option is in the second state.

6. The information handling system of claim 5, wherein the processor is further configured to:
 log, to a service processor of the information handling system, an error log when the second information uniquely identifies the different information handling system, the error log to indicate that the second information uniquely identifies the different information handling system.

7. The information handling system of claim 1, wherein the processor is further configured to:
 determine that the second information does not uniquely identify any information handling system; and
 determine that the unidentified NVDIMM is newly installed to the information handling system based upon the determination that the second information does not uniquely identify any information handling system.

8. The information handling system of claim 1, wherein the first NVDIMM is a DC Persistent Memory Module (DCPMM).

9. A method, comprising:
 instantiating, by a processor of an information handling system, a basic input/output system and an operating system;
 providing, on a first non-volatile dual in-line memory module (NVDIMM), a first partition of non-volatile memory, wherein the first partition is a reserved partition that is accessible only to the basic input/output system;

providing, on the first NVDIMM, a second partition of non-volatile memory, wherein the second partition is accessible to the operating system;
generating, by the processor, first information uniquely identifying the particular information handling system;
writing, by the processor, the first information to the first partition;
booting the information handling system;
reading second information from a third partition of an unidentified NVDIMM, wherein the third partition is a second reserved partition that is accessible only to the basic input/output system;
determining that the second information uniquely identifies the particular information handling system;
determining that the unidentified NVDIMM is the first NVDIMM in response to the second information matching the first information; and
initializing the first NVDIMM in response to determining that the unidentified NVDIMM is the first NVDIMM.

10. The method of claim 9, further comprising:
determining that the second information uniquely identifies a different information handling system;
determining that the unidentified NVDIMM is not the first NVDIMM in response to determining that the second information uniquely identifies the different information handling system; and
determining, by the processor, if a configuration option is in a first state or in a second state in response to determining that the unidentified NVDIMM is not the first NVDIMM.

11. The method of claim 10, further comprising:
halting, by the processor, initialization of the unidentified NVDIMM when the configuration option is in the first state.

12. The method of claim 11, further comprising:
erasing a fourth partition of non-volatile memory of the unidentified NVDIMM when the configuration option is in the second state, the fourth partition being accessible to the operating system.

13. The method of claim 11, further comprising:
erasing, by the processor, the third region when the configuration option is in the second state.

14. The method of claim 13, further comprising:
logging, by the processor to a service processor of the information handling system, an error log when the second information uniquely identifies the different information handling system, the error log to indicate that the second information uniquely identifies the different information handling system.

15. The method of claim 9, further comprising:
determining that the second information does not uniquely identify any information handling system; and
determining, by the processor, that the unidentified NVDIMM is newly installed to the information handling system based upon the determination that second information does not uniquely identify any information handling system.

16. The method of claim 9, wherein the first NVDIMM is a DC Persistent Memory Module (DCPMM).

17. An information handling system, comprising:
a first DC persistent memory module (DCPMM) configured to instantiate a first partition of non-volatile memory and a second partition of non-volatile memory, the first partition being a first reserved partition that is accessible to only a basic input/output system instantiated on the information handling system, and the second partition being accessible to an operating system instantiated on the information handling system; and
a processor configured to:
instantiate the basic input/output system and the operating system;
generate first information uniquely identifying the particular information handling system;
write the first information to the first partition;
boot the information handling system;
read second information from a third partition of an unidentified DCPMM, wherein the third partition is a second reserved partition that is accessible only to the basic input/output system;
determine that the second information uniquely identifies the particular information handling system;
determine that the unidentified NVDIMM is the first NVDIMM in response to the second information matching the first information; and
initialize the first DCPMM in response to determining that the unidentified DCPMM is the first DCPMM.

18. The information handling system of claim 17, wherein the processor is further configured to:
determine that the second information uniquely identifies a different information handling system;
determine that the unidentified DCPMM is not the first DCPMM in response to determining that the second information uniquely identifies the different information handling system; and
halt initialization of the unidentified NVDIMM in response to determining that the unidentified DCPMM is not the first DCPMM.

19. The information handling system of claim 18, wherein the processor is further configured to:
erase the third partition in further response to determining that the unidentified DCPMM is not the first DCPMM.

20. The information handling system of claim 18, wherein the processor is further configured to:
erase a fourth partition of non-volatile memory of the unidentified DCPMM in further response to determining that the unidentified DCPMM is not the first DCPMM.

* * * * *